(12) United States Patent
Huang et al.

(10) Patent No.: US 11,968,438 B2
(45) Date of Patent: Apr. 23, 2024

(54) ELECTRONIC DEVICE

(71) Applicant: VIVO MOBILE COMMUNICATION CO., LTD., Dongguan (CN)

(72) Inventors: Kai Huang, Dongguan (CN); Zongwen He, Dongguan (CN); Huasheng Zhu, Dongguan (CN); Panpan Zhu, Dongguan (CN); Shangming Yang, Dongguan (CN); Ling Hu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/746,898

(22) Filed: May 17, 2022

(65) Prior Publication Data

US 2022/0279103 A1 Sep. 1, 2022

Related U.S. Application Data

(63) Continuation of application No. PCT/CN2020/128947, filed on Nov. 16, 2020.

(30) Foreign Application Priority Data

Nov. 18, 2019 (CN) .......................... 201911130039.4

(51) Int. Cl.
  *G02B 5/30* (2006.01)
  *H04N 23/57* (2023.01)
  *H04N 23/63* (2023.01)
(52) U.S. Cl.
  CPC ........... *H04N 23/57* (2023.01); *G02B 5/3033* (2013.01); *H04N 23/63* (2023.01)
(58) Field of Classification Search
  CPC .................................................. H04N 23/63
  (Continued)

(56) References Cited

U.S. PATENT DOCUMENTS 10,895,773 B1   1/2021  Zhang
2016/0062011 A1* 3/2016  Shin ....................... G02B 5/305
                                                 359/489.07

FOREIGN PATENT DOCUMENTS

CN   106534652 A   3/2017
CN   107241466 A   10/2017
(Continued)

OTHER PUBLICATIONS

International Search Report issued in corresponding International Application No. PCT/CN2020/128947, mailed Feb. 19, 2021, 5 pages.

(Continued)

*Primary Examiner* — Joel W Fosselman
(74) *Attorney, Agent, or Firm* — IPX PLLC

(57) ABSTRACT

Disclosed is an electronic device including a display module and a camera module. The display module includes a first substrate and a second substrate stacked with each other, and a routing structure arranged on a surface of one side of the second substrate facing towards the first substrate, and provided with a first light-passing hole. The camera module includes a camera body and a light-shielding layer arranged on a surface of one side of the first substrate away from the second substrate and provided with a light inlet hole and a second light-passing hole. The first light-passing hole, the second light-passing hole, and the light inlet hole are arranged in an optical axis direction of the camera module. An orthographic projection of the first light-passing hole and the second light-passing hole on a surface perpendicular to the optical axis direction fall within an orthographic projection of the light inlet hole.

8 Claims, 1 Drawing Sheet

(58) Field of Classification Search
USPC .................................................. 348/207.99
See application file for complete search history.

(56) References Cited

FOREIGN PATENT DOCUMENTS

| | | | |
|---|---|---|---|
| CN | 209028373 U | | 6/2019 |
| CN | 110120996 A | | 8/2019 |
| CN | 110149470 A | | 8/2019 |
| CN | 110191216 A | | 8/2019 |
| CN | 110299072 A | | 10/2019 |
| CN | 110300246 A | | 10/2019 |
| CN | 110333622 A | | 10/2019 |
| CN | 110426878 A | | 11/2019 |
| CN | 209642752 U | | 11/2019 |
| CN | 110784635 A | | 2/2020 |
| CN | 110784636 A | | 2/2020 |
| CN | 110827672 A | | 2/2020 |
| KR | 20100030523 | * | 3/2010 |
| KR | 101231480 | * | 2/2013 |
| KR | 20180113421 A | | 10/2018 |

OTHER PUBLICATIONS

First Office Action issued in related Chinese Application No. 201911130039.4, mailed Sep. 21, 2020, 8 pages.
Extended European Search Report issued in related European Application No. 20889914.6, mailed Nov. 30, 2022, 11 pages.

* cited by examiner

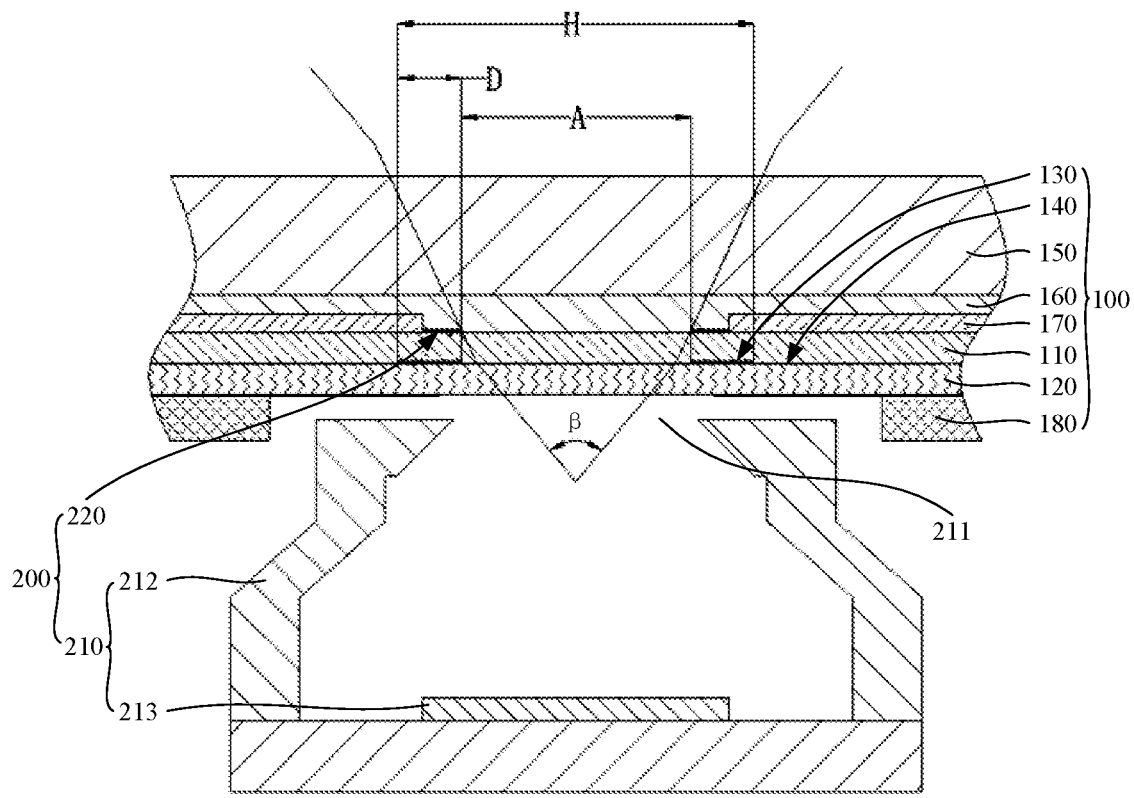

ELECTRONIC DEVICE

CROSS-REFERENCE TO RELATED APPLICATIONS

This application is a continuation of International Application No. PCT/CN2020/128947, filed Nov. 16, 2020, which claims priority to Chinese Patent Application No. 201911130039.4, filed Nov. 18, 2019. The entire contents of each of the above-referenced applications are expressly incorporated herein by reference.

TECHNICAL FIELD

The present disclosure relates to the technical field of communication devices, and in particular, to an electronic device.

BACKGROUND

Electronic devices such as smartphones and tablets have become indispensable products in people's life, and the screen-to-body ratio of electronic devices is one of the important factors affecting user experience. Therefore, how to increase the screen-to-body ratio of electronic devices has become the design direction that the technicians in the art pay attention to.

In order to increase the screen-to-body ratio of existing electronic devices, the camera module can be arranged below the display module, and the display module is provided with a light-passing hole, so that it can be ensured that the camera module can work normally. The camera module mainly includes a bracket, a lens assembly, a light-shielding layer, and other devices. The lens assembly is mounted in the bracket, the light-shielding layer is mounted on the bracket, and the light-shielding layer is located above the lens assembly.

Due to a certain distance between the light-shielding layer and the display module, the light-passing hole formed in the display module needs to be larger than an inner diameter of the light-shielding layer. Meanwhile, due to an assembling error between the display module and the camera module, it is necessary to consider this assembling error and further enlarge the size of the light-passing hole when a hole is formed in the display module. Therefore, the light-passing hole formed in the existing display module is relatively large, resulting in relatively small screen-to-body ratio of the electronic device.

SUMMARY

The present disclosure discloses an electronic device, including:
 a display module, including a first substrate, a second substrate, and a routing structure, the first substrate and the second substrate are stacked, the routing structure is arranged on a surface of one side of the second substrate facing towards the first substrate, and the routing structure is provided with a first light-passing hole; and
 a camera module, including a camera body and a light-shielding layer, the camera body is provided with a light inlet hole, the second substrate is located between the first substrate and the camera body, the light-shielding layer is arranged on a surface of one side of the first substrate away from the second substrate, the light-shielding layer is provided with a second light-passing hole, the first light-passing hole, the second light-passing hole and the light inlet hole are arranged in an optical axis direction of the camera module, and orthographic projections of the first light-passing hole and the second light-passing hole on a surface perpendicular to the optical axis direction fall within an orthographic projection of the light inlet hole on the surface perpendicular to the optical axis direction.

The technical solutions used by the present disclosure can achieve the following beneficial effects:
 in the electronic device disclosed by the present disclosure, the light-shielding layer of the camera module is arranged on the surface of one side of the first substrate away from the second substrate. According to this design, on one hand, a distance between the light-shielding layer and the display module is nearly zero, so the first light-passing hole may be smaller; and on the other hand, there is no assembling error between the display module and the light-shielding layer, so it is unnecessary to consider the assembling error when the first light-passing hole is formed, the size of the first light-passing hole may be further reduced, and the screen-to-body ratio of the electronic device is higher.

BRIEF DESCRIPTION OF DRAWINGS

The accompanying drawings described herein are used to provide a further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings:

FIG. 1 is a section view of part of a structure of an electronic device, according to an embodiment of the present disclosure.

DETAILED DESCRIPTION

To make the objectives, technical solutions, and advantages of the present disclosure clearer, the following clearly describes the technical solutions of the present disclosure with reference to the specific embodiments of the present disclosure and the corresponding accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The technical solutions disclosed by various embodiments of the present disclosure are described in detail below with reference to the accompanying drawings.

As shown in FIG. 1, an embodiment of the present disclosure provides an electronic device. The electronic device may specifically include a display module 100 and a camera module 200.

The display module 100 may specifically include a first substrate 110, a second substrate 120, and a routing structure 130, wherein the first substrate 110 and the second substrate 120 are stacked, and the routing structure 130 is arranged on a surface of one side of the second substrate 120 facing towards the first substrate 110. The first substrate 110 and the second substrate 120 may be glass plates, and a thin film transistor may be arranged on the second substrate 120. The routing structure 130 may be ring-shaped structure, the routing structure 130 is provided with a first light-passing hole, and the first light-passing hole enables light to pass through, so that light in the external environment can enter the camera module 200. The display module 100 may further include a light-emitting portion 140, a light-transmitting cover plate 150, an optical adhesive 160, a polarizer 170 and foam 180, wherein the light-emitting portion 140 may be arranged between the first substrate 110 and the second substrate 120, and the light-emitting portion 140 may be an organic light-emitting layer; the polarizer 170 may be arranged on a surface of one side of the first substrate 110 away from the second substrate 120; the light-transmitting cover plate 150 is located on one side of the first substrate 110 away from the second substrate 120, and the light-transmitting cover plate 150 may be connected to the polarizer 170 through the optical adhesive 160; the foam 180 may be arranged on one side of the second substrate 120 away from the first substrate 110, the foam 180 may be bonded to the second substrate 120 and may be provided with an avoidance hole, and at least one part of the camera module 200 may be located in the avoidance hole, so that the influence on the normal work of the camera module 200 by stray light in the display module 100 is avoided; meanwhile, the space occupied by the camera module 200 can be reduced, so that the thickness of the electronic device can be reduced.

The camera module 200 may specifically include a camera body 210 and a light-shielding layer 220, the camera body 210 is provided with a light inlet hole 211, the second substrate 120 is located between the first substrate 110 and the camera body 210, the light-shielding layer 220 is arranged on a surface of one side of the first substrate 110 away from the second substrate 120, and the light-shielding layer 220 is provided with a second light-passing hole. The camera body 210 may specifically include a bracket 212, a lens assembly, and a light-sensing chip 213, the lens assembly is arranged on the bracket 212, and the lens assembly may include a convex lens, a concave lens, and other lenses, so that the light converging effect can be achieved; and the light-sensing chip 213 may be arranged in the bracket 212, the light-sensing chip 213 is provided with a light-sensing area for sensing light, and the light-sensing chip 213 may convert an optical signal into an electrical signal, so that corresponding image information is acquired. The second light-passing hole enables light to pass through, so that light in the external environment can enter the camera module 200 and arrive at the light-sensing area of the light-sensing chip 213, and a shooting function can be realized.

The routing structure 130 and the light-shielding layer 220 can play a role in shielding light, and the first light-passing hole, the second light-passing hole, and the light inlet hole 211 are arranged in the optical axis direction of the camera module 200, so light in the external environment can sequentially pass through the second light-passing hole and the first light-passing hole and finally pass through the light inlet hole 211 to enter the camera module 200, and the camera module 200 can realize the shooting function. An orthographic projection of the first light-passing hole on a surface perpendicular to the optical axis direction of the camera module 200 and an orthographic projection of the second light-passing hole on the surface perpendicular to the optical axis direction fall within an orthographic projection of the light inlet hole 211 on the surface perpendicular to the optical axis direction. That is, during observation in the optical axis direction of the camera module 200, an overall size of the first light-passing hole and an overall size of the second light-passing hole are less than an overall size of the light inlet hole 211. The size of the light inlet hole 211 is slightly large. Such arrangement does not affect the screen-to-body ratio of the display module 100 and can ensure that light in the external environment enters the camera module 200 as much as possible. The first light-passing hole and the second light-passing hole will affect the screen-to-body ratio of the display module 100, so on the premise of meeting the shooting requirement of the camera module 200, the first light-passing hole and the second light-passing hole can be set as small as possible, thereby reducing the occupancy rate of the routing structure 130 and the light-shielding layer 220 on the display area and increasing the screen-to-body ratio of the electronic device.

In the electronic device, the light-shielding layer 220 of the camera module 200 is arranged on the display module 100. According to this design, on one hand, a distance between the light-shielding layer 220 and the display module 100 is nearly zero, so the first light-passing hole may be smaller; and on the other hand, there is no assembling error between the display module 100 and the light-shielding layer 220, so it is unnecessary to consider the assembling error when the first light-passing hole is formed, the size of the first light-passing hole may be further reduced, and the screen-to-body ratio of the electronic device is higher. Meanwhile, after the size of the first light-passing hole is reduced, the appearance texture of the electronic device is improved, and the user experience is improved accordingly.

In an embodiment, at least one part of the light-shielding layer 220 may be located between the first substrate 110 and the polarizer 170. That is, the light-shielding layer 220, the first substrate 110 and the polarizer 170 may be stacked. At this time, the positions of the light-shielding layer 220, the first substrate 110, and the polarizer 170 are relatively independent, so it is more convenient to form the display module 100.

In another embodiment, the polarizer 170 is provided with a third light-passing hole, and the light-shielding layer 220 is located in the third light-passing hole. The third light-passing hole enables light to pass through, so that the light transmittance of an area corresponding to the camera module 200 is increased, and the shooting quality of the camera module 200 is improved. At this time, one part of the optical adhesive 160 may extend into the third light-passing hole so as to fill the space in the third light-passing hole other than the light-shielding layer 220. Therefore, this part of the optical adhesive 160 may be in contact with the surface of one side of the first substrate 110 away from the second substrate 120 to be connected to the first substrate 110, so that the structural strength of the display module 100 is higher. More importantly, when this structure is adopted, the light-shielding layer 220 may be arranged by using the space occupied by the polarizer 170, so the light-shielding layer 220 will not additionally occupy space, and the thickness of the whole display module 100 is smaller; in addition, the part of the polarizer 170 without a hole has a certain light-shielding effect, so during observation in the optical axis direction of the camera module 200, the light-shielding layer 220 and the polarizer 170 may form a seamless butting light-shielding structure, the size of the light-shielding layer 220 is smaller, and the manufacturing cost of the light-shielding layer 220 is reduced.

Further, the light-shielding layer 220 may be in contact with an inner wall of the third light-passing hole. Compared with the solution that there is a certain interval between the light-shielding layer 220 and the inner wall of the third light-passing hole, when the light-shielding layer 220 is in contact with the inner wall of the third light-passing hole, in the process of processing the display module 100, the positions of the light-shielding layer 220 and the polarizer 170 may be referenced to each other, so that rapid formation of the display module 100 is facilitated, and the forming efficiency of the display module is improved.

As mentioned above, the first light-passing hole and the second light-passing hole will affect the screen-to-body ratio of the display module 100; therefore, the first light-passing hole and the second light-passing hole may be set as small as possible. In an embodiment, an orthographic projection of the first light-passing hole on a surface perpendicular to the optical axis direction of the camera module 200 and an orthographic projection of the second light-passing hole on the surface perpendicular to the optical axis direction may coincide with each other. In other words, a shape of the first light-passing hole is the same as a shape of the second light-passing hole, and the sizes of the two are the same. This arrangement can make the sizes of the first light-passing hole and the second light-passing hole as small as possible; meanwhile, the relative positions of the first light-passing hole and the second light-passing hole may be referred to each other when the display module 100 is formed, so that it is more convenient to process the display module 100.

In the embodiment of the present disclosure, the outline shapes of the routing structure 130 and the light-shielding layer 220 may be arranged flexibly, for example, the outline shapes may be a rectangle, a circle, and an ellipse; meanwhile, the shapes of the first light-passing hole and the second light-passing hole may be selected flexibly, for example, the first light-passing hole and the second light-passing hole may be a rectangular hole, a circular hole, an elliptic hole and the like. In an embodiment, considering that the shape of the field of view of the camera module 200 is usually circular, so in order to adapt to the camera module 200 to further increase the screen-to-body ratio of the electronic device, the routing structure 130 and the light-shielding layer 220 may be arranged in a ring-shaped structure. At this time, a radial width of the light-shielding layer 220 may be less than a radial width of the routing structure 130, so that too large light-shielding area caused by too large radial width of the light-shielding layer 220 can be avoided, and the above aim can be fulfilled.

Referring to FIG. 1, H=A+D*2, wherein H is the size of a hole on the appearance surface of the display module 100 which cannot be used for displaying, A is a hole diameter of the second light-passing hole (or a hole diameter of the first light-passing hole), and D is a width of the routing structure 130. The field of view 13 of the camera module 200 is a fixed value, so A is basically a fixed value, and D is basically a fixed value. At this time, the size of H is not affected by the assembling error and other factors, so H may be set smaller.

In order to improve the shooting effect of the camera module 200, a distance between a focus of the camera body 210 and the light-shielding layer 220 in the optical axis direction may be a preset value. That is, when the position of the light-shielding layer 220 changes, the position of the camera body 210 changes accordingly to ensure that the focus of the camera body 210 and the light-shielding layer 220 keep mutually matched positions, so that the shooting effect is improved. In the embodiment of the present disclosure, since the light-shielding layer 220 moves up into the display module 100, the distance between the camera body 210 and the display module 100 can be further reduced, and the display module 100 and the camera module 200 are distributed more compact, so that it is more beneficial to stacking of parts in the electronic device.

The forming manner of the light-shielding layer 220 has various implementation solutions. In an embodiment, the light-shielding layer 220 may be formed by a film-coating process. That is, the light-shielding layer 220 may be of a film-coating structure. This film-coating structure is convenient to form, and the thickness of the formed light-shielding layer 220 is smaller, so it is more beneficial to control the thickness of the electronic device. Specifically, the shielding layer 220 is arranged on the surface of one side of the first substrate 110 away from the second substrate 120, and it may be necessary to arrange other structures on the surface of one side of the first substrate 110 facing towards the second substrate 120 through an evaporation process; therefore, the light-shielding layer 220 may be coated after the evaporation process and the bonding process of the first substrate 110 and the second substrate 120 are performed, or the light-shielding layer 220 may be coated before the evaporation process and the bonding process of the first substrate 110 and the second substrate 120 are performed. When the previous implementation manner is adopted, it is necessary to correspondingly add a protection measure for preventing the first substrate 110 and the second substrate 120 from being scratched. Certainly, the light-shielding layer 220 may also be made by other processes, such as a printing process, so that the light-shielding layer 220 has a printing structure.

When the electronic device is assembled, the alignment and fixation between the light-shielding layer 220 and the camera body 210 can be realized by means of accurately positioning a Charge-coupled Device (CCD) camera and driving the camera module 200 by a micromotor to dynamically adjust alignment, so that the relative position of the light-shielding layer 220 and the camera body 210 has higher precision, the imaging effect of the camera module 200 is ensured, it is unnecessary to consider the alignment error and increase the size of the first light-passing hole, and the screen-to-body ratio of the electronic device can be increased.

The electronic device disclosed in the embodiments of the present disclosure may be a smartphone, a tablet computer, an e-book reader, or a wearable device. Certainly, the electronic device may also be other devices, which is not limited in the embodiments of the present disclosure.

The embodiments of the present disclosure focus on describing differences between the embodiments, and different optimization features of the embodiments may be combined to form better embodiments provided that they are not contradictory. Considering brevity, details are not described herein again.

The above is only embodiments of the present disclosure, and is not intended to limit the present disclosure. Various changes and modifications may be made to the present disclosure by those skilled in the art. Any modifications, equivalent substitutions, improvements and the like made within the fine and principle of the present disclosure should be included within the scope of the claims of the present disclosure.

What is claimed is:

1. An electronic device, comprising:
a display module, wherein the display module comprises a first substrate, a second substrate, and a routing structure, wherein the first substrate and the second substrate are stacked, the routing structure is arranged on a surface of one side of the second substrate facing towards the first substrate, and the routing structure is provided with a first light-passing hole formed as an opening through the routing structure; and
a camera module, wherein the camera module comprises a camera body and a light-shielding layer, wherein the camera body is provided with a light inlet hole, the light inlet hole is arranged near a surface of the second substrate away from the first substrate, the second substrate is located between the first substrate and the camera body, the light-shielding layer is arranged on a surface of one side of the first substrate away from the second substrate, the light-shielding layer is provided with a second light-passing hole, wherein the first light-passing hole, the second light-passing hole, and the light inlet hole are arranged in an optical axis direction of the camera module, and orthographic projections of the first light-passing hole and the second light-passing hole on a surface perpendicular to the optical axis direction fall within an orthographic projection of the light inlet hole on the surface perpendicular to the optical axis direction.

2. The electronic device according to claim 1, wherein the display module further comprises a polarizer, wherein the polarizer is arranged on a surface of one side of the first substrate away from the second substrate, and at least one part of the light-shielding layer is located between the first substrate and the polarizer.

3. The electronic device according to claim 1, wherein the display module further comprises a polarizer, wherein the polarizer is arranged on a surface of one side of the first substrate away from the second substrate, the polarizer is provided with a third light-passing hole, and the light-shielding layer is located in the third light-passing hole.

4. The electronic device according to claim 3, wherein the light-shielding layer is in contact with an inner wall of the third light-passing hole.

5. The electronic device according to claim 1, wherein the orthographic projection of the first light-passing hole on the surface perpendicular to the optical axis coincides with the orthographic projection of the second light-passing hole on the surface perpendicular to the optical axis.

6. The electronic device according to claim 1, wherein the routing structure and the light-shielding layer have ring-shaped structures, and a radial width of the light-shielding layer is less than a radial width of the routing structure.

7. The electronic device according to claim 1, wherein a distance between a focus of the camera body and the light-shielding layer in the optical axis direction is a preset value.

8. The electronic device according to claim 1, wherein the light-shielding layer has a film-coating structure.

\* \* \* \* \*